United States Patent Office 3,278,497
Patented Oct. 11, 1966

3,278,497
REACTION PRODUCTS OF (1) AZIRIDINYL COMPOUNDS, (2) METHYLOL PHOSPHORUS COMPOUNDS AND (3) SULFUR COMPOUNDS
Joel B. Bullock and Clark M. Welch, New Orleans, La., assignors to the United States of America as represented by the Secretary of Agriculture
No Drawing. Filed Nov. 14, 1962, Ser. No. 237,767
7 Claims. (Cl. 260—79)

A non-exclusive, irrevocable, royalty-free license in the invention herein described, throughout the world for all purposes of the United States Government, with the power to grant sublicenses for such purposes, is hereby granted to the Government of the United States of America.

This invention relates to new phosphorus, nitrogen and sulfur containing polymers, processes for their production, and processes of employing these polymers in the production of flame-proofed, weather-resistant, organic fibrous materials. In general, this invention relates to polymers capable of being produced by the reaction of compounds which contain two or more 1-aziridinyl groups

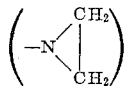

attached directly to a non-metallic atom, with a methylol phosphorus compound of the formula $(RCH_2)_4P^+X^-$ where at least two of the R groups are OH and X represents a monovalent anion, with certain sulfur containing compounds.

It is the objective of the present invention to prepare a class of synthetic materials, or polymers, having particular utility in the textile and coating fields as a flame-resistant, weather-resistant finish. Many of the existing flame-retardant coatings for textiles are not durable to prolonged exposure to sunlight acting by itself or combined with the effects of rain, ozone, atmosphere contaminants and laundering, and such coatings cannot be used for drapes, tents, tarpaulins, awnings and clothing exposed to these destructive agents for prolonged periods. The present invention partially overcomes this difficulty.

We have discovered that polymers may be produced containing phosphorous, nitrogen, and sulfur by the reaction of tris(1-aziridinyl)phosphine oxide, tetrakis(hydroxymethyl)-phosphonium chloride and certain sulfur-containing compounds. Such polymers can be produced in the form of solid synthetic resins. They can be deposited on the surface and/or in the interstices of hydrophilic fibrous organic materials, i.e., organic materials which absorbs or adsorb water. When such resins are deposited, they reduce the combustibility of the hydrophilic fibrous material.

The inclusion of the sulfur-containing compounds in the copolymer often results in increased stability of the copolymer to prolonged weathering. A novel and unexpected feature of the resulting sulfur-containing copolymers is that they decrease the rate at which the tensile strength of the textile is lost during exposure to sunlight, oxygen and moisture. Surprisingly, the increase in stability to weathering produced in the organic textile material is greater in many cases than the increase in durability to weathering produced in the copolymer itself. A further feature of the copolymers is that they do not affect the tensile strength or stiffness of the textile material.

The sulfur compounds effective in these respects are those containing one or more hydrogen atoms attached to oxygen, sulfur or nitrogen atoms, and in addition containing sulfur having an oxidation number less than +6 and preferably as low as −2. Metal salts of such compounds are also effective. The sulfur compounds that are soluble in water to the extent of 0.2% or greater are preferable because of their ease of application. Examples of such sulfur compounds are sodium thiosulfate, potassium thiocyanate, 2-mercaptoethanol, thiourea, bis(2-hydroxyethyl) sulfide, and bis(2-hydroxyethyl) disulfide.

The sulfur-containing compound, which may be designated as HY, becomes an integral and permanent part of the flame-retardant polymer molecules by virtue of the hydroxyl, mercapto or amino groups in the sulfur compound which react readily with the aziridinyl rings of the tris(1-aziridinyl) phosphine oxide and also with the hydroxymethyl groups of tetrakis(hydroxymethyl)phosphonium chloride. In the foregoing designation of the sulfur-containing compound, "Y" represents the moiety of the compound which is attached to the one or more hydrogen atoms, as defined in the previous paragraph. Molecules of the resulting copolymers are believed to contain recurring structural units of the types

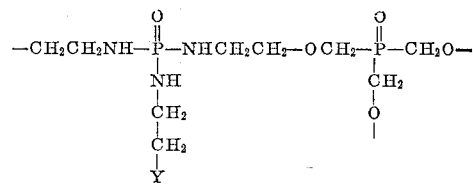

as well as

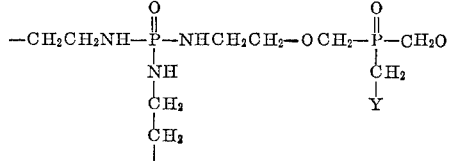

These copolymers are applicable to the same type of textile materials as are the copolymers made solely from tris(1-aziridinyl)phosphine oxide and tetrakis(hydroxymethyl)phosphonium chloride (G. L. Drake, W. A. Reeves and L. H. Chance, U.S. Patent 2,886,539, May 12, 1959). The copolymers of this invention may be applied to cotton, rayon, ramie, jute, wool, paper, cardboard and like materials.

The copolymers may be prepared in bulk form from a solution of the sulfur-containing compound, tris(1-aziridinyl)phosphine oxide, and tetrakis(hydroxymethyl)phosphine chloride, the mixture being allowed to stand at 20–80° C. at atmospheric or reduced pressure until the water has partially evaporated. Polymerization then occurs. Thin films or coatings may be rapidly freed of water at temperatures in the range 70–180° C. without occurrence of undesired side reactions between the water and the tris(1-aziridinyl)phosphine oxide. The polymers can be produced in the form of clear viscous liquids, rubbery solids or hard glasses and can be molded by the conventional techniques of molding thermosetting resins.

Although the polymers of this invention may be formed under acidic, neutral or alkaline conditions, their formation on textile materials is preferably carried out in nearly neutral media. A solution of the tris(1-aziridinyl)phosphine oxide, the tetrakis(hydroxymethyl)phosphonium chloride and the sulfur compound is buffered with an acid-acceptor such as triethanolamine. When the sulfur compound used is an alkali metal salt, its reaction with the tris(1-aziridinyl)phosphine oxide liberates the corresponding alkali metal hydroxide. The amount of triethanolamine used may be decreased accordingly. The presence of the usual types of wetting agents is also helpful in applying the treating solutions to textiles. By varying the proportions of the three components which combine to form the copolymer, a wide range of properties is obtainable in the treated textile material.

The combustibility of organic fibrous materials can be reduced in accordance with this invention, by impregnating the materials with an aqueous solution or dispersion of the monomeric compounds and curing the impregnated materials at a temperature sufficiently high to give water-insoluble polymers. Removal of unreacted reagents by an afterwash is recommended.

Where textiles are being treated by the process of this invention, it is of advantage to remove excess impregnating liquor by passing through a squeeze roll prior to drying and curing the material. It is also of advantage to dry the impregnated textile at 70–110° C. for 2–15 min. before it is cured at 110–170° C. for 2–15 min. On 6.5 oz. white twill treated by this process, optimum fabric properties were obtained by drying 6–10 min. at 80–85° C. and curing 4–6 min. at 150–155° C.

In the examples provided below the following methods were used to demonstrate properties of fabrics produced by the method of this invention:

(1) The tensile strength of the fabrics was determined by breaking six inch strips, in the warp direction, one inch wide. Values on weathered samples were obtained by breaking a strip having the same thread count as the unweathered fabric. Samples were all conditioned at least 4 hours at 70° C. and 65% relative humidity before the breaking strengths were determined.

(2) The strip angle flame resistance test as described in Textile Research Journal, volume 23, page 529 (1953), was applied. In this test, the degree of flame resistance is measured by determining the maximum angle at which a narrow strip of cloth will fail to burn when held in the vertical position and ignited at the bottom, then slowly rotated until the flame is extinguished. The greater the angle at which the flame is extinguished, the greater the degree of flame resistance; 180 degrees represents the highest degree of flame resistance.

(3) The vertical flame test as described in U.S. Federal Service, Federal Specification CCC-T-191b (1951). In this test, a strip of cloth is exposed to the luminous flame of a Bunsen burner and the degree of flame resistance is judged by the length of a tear produced through the charred area by a standard weight. The results of this test are expressed as char length in inches.

(4) The durability of the flame-resistant textiles produced by this process to outdoor weather conditions was determined. The fabrics were stapled, smooth, to wooden frames at a 45° angle and three feet above the ground. The frames faced south and the samples so exposed, received unshaded sunlight throughout the day. At specified intervals, fabric samples were tested for breaking strength and analyzed for nitrogen, phosphorus and sulfur.

The following examples are given by way of illutsration and do not define the limitations of this invention. All parts and percentages are by weight. For simplicity tris(1-aziridinyl)phosphine oxide will be designated as APO, tetrakis(hydroxymethyl)phosphonium chloride as THPC, and triethanolamine as TEA.

EXAMPLE 1

An aqueous solution was prepared containing 40 parts APO, 44 parts THPC, 11 parts TEA, 3 parts non-ionic wetting agent and 15 parts thiourea in 187 parts water. The solution was placed in a thin layer in a crystallizing dish and kept at 80° C. for 3 hours, causing a hard, clear, pale yellow polymer to be formed. This polymer contained 11.90% phosphorus, 13.97% nitrogen and 5.68% sulfur. A portion of this material was washed in water, absolute ethanol, and diethyl ether to remove unreacted reagents, and then air dried. The resulting pale yellow polymer contained 12.13% phosphorus, 14.73% nitrogen, and 4.78% sulfur. A similar product was formed when the polymerization was carried out at room temperature for 3–4 days.

EXAMPLE 2

A polymer was prepared by heating a mixture of 157 parts water, 40 parts APO, 44 parts THPC, 11 parts TEA, 3 parts non-ionic wetting agent, and 30 parts sodium thiosulfate at 80° C. for 3 hours. The resulting hard polymer contained 7.74% nitrogen, 10.36% phosphorus and 6.80% sulfur. A similar polymer was formed when the process was carried out at room temperature for 3–4 days.

EXAMPLE 3

Potassium thiocyanate, 15 parts, was included in the solution used to prepare a polymer from 40 parts APO, 44 parts THPC, 11 parts TEA, and 3 parts wetting agent in 187 parts water. The polymer which was produced by heating at 80° C. for 3 hours contained 11.76% phosphorus, 10.1% nitrogen and 3.73% sulfur. A similar polymer formed when the reaction was allowed to take place at room temperature for 3–4 days.

EXAMPLE 4

Sodium thiosulfate, 15 parts, was included in the solution of 40 parts APO, 44 parts THPC, 11 parts TEA, and 3 parts wetting agent in 187 parts water. The clear polymer formed when the mixture was heated at 80° C. for 3 hours contained 11.59% phosphorus, 9.03% nitrogen, and 4.25% sulfur. The polymer could also be formed by carrying out the process at room temperature for 3–4 days.

EXAMPLE 5

An aqueous solution was prepared by dissolving 20 parts APO, 22 parts THPC, 5.4 parts TEA, 1.4 parts non-ionic wetting agent, and 4.1 parts thiourea in 85.7 parts water. White cotton twill, 6.5 oz./yd., was impregnated with the solution, passed through the squeeze rolls of a padder to give a wet pick-up of 73%, dried 4 minutes at 80–85° C., and cured 4 min. at 155° C. After curing, the fabric was given an afterwash and dried. The resin add-on was 20.8%. Elemental analyses showed 2.66% nitrogen, 2.73% phosphorus, and 1.39% sulfur. It passed the 180° strip angle flame resistance test. Seven months' outdoor weathering showed a strength loss of only 17.5%. The control fabric, weathered only 6 months, lost 30% of its original treated strength. This control was prepared as above, the thiurea being replaced with an equal weight of water. Prior to weathering the test, control and untreated fabric all had the same breaking strength, within ±1%.

EXAMPLE 6

A solution of 20 parts APO, 22 parts THPC, 5.5 parts TEA, 1.4 parts non-ionic wetting agent and 4.2 parts di-(hydroxyethyl)disulfide dissolved in 87 parts water was applied to 6.5 oz./yd. cotton twill by padding. The fabric was dried 6 min. at 80–85° C., cured 4 min. at 155° C., washed and dried. After equilibrating the fabric showed a resin add on of 20.8%. It passed the 180° strip angle flame resistance test. On 6 months' outdoor exposure, strength losses of only 4% were found, as compared with a loss of 30% in the fabric treated without any sulfur-containing component in the polymer.

EXAMPLE 7

The cotton twill was treated as described in Example 6 but the sulfur-containing co-monomer was sodium thiosulfate. The fabric showed a resin add-on of 20.4%. It passed the 180° strip angle flame resistance test. On 6 months' outdoor exposure, strength losses were 12%, nitrogen losses 14%, and phosphorus losses 16% of the value measured before exposure. The control APO-THPC treated fabric, in an equivalent period of time, lost 30% of its original strength as well as 27% of the nitrogen and 30% of the phosphorus from the resin finish.

The breaking strength of the test and control fabrics differed by less than 4% from untreated fabric.

EXAMPLE 8

A solution of 20 parts APO, 22 parts THPC, 5.5 parts TEA, 1.4 parts wetting agent and 4.2 parts potassium thiocyanate in 87 parts water, was applied to 6.5 oz./yd. cotton will by the previously described procedure. The resulting flameproofed fabric showed an add on of 18.4%. It passed the 180° strip angle flame resistance test. Six months' outdoor weathering of this fabric showed strength losses of 13%. The control which did not contain a sulfur compound in the polymer, lost 30% of the strength it originally had after resin treatment. The breaking strength of test and control fabrics differed from untreated fabric by less than 4%.

EXAMPLE 9.

White cotton twill (6.5 oz./yd.) was treated with a solution of 40 parts APO, 44 parts THPC, 11 parts TEA, 3 parts non-ionic wetting agent and 15 parts sodium thiosulfate in 187 parts water. The solution was padded on to the fabric, which was then dried and cured as in previous examples. After washing and drying, the fabric showed a resin add-on of 18.8% and a char length of 3.28 inches. It passed the 180° strip angle flame resistance test. Elemental analysis showed 2.22% phosphorus, 2.56% nitrogen and 1.05% sulfur in the polymer attached to the fabric.

EXAMPLE 10

A solution of 40 parts APO, 44 parts THPC, 11 parts TEA, 3 parts non-ionic wetting agent, and 30 parts sodium thiosulfate, was prepared in 157 parts water. The fabric, 6.5 oz./yd. white cotton twill, was padded with the solution to a wet pickup of 85%, dried 10 min. at 80–85° C., cured 4 min. at 155° C., washed in tap water and dried. After equilibration, the fabric had an add on of 17.2% resin and a char length of 3.10 inches by the standard vertical flame test. It passed the 180° strip angle flame resistance test. The treated fabric contained 1.84% nitrogen, 2.02% phosphorus and 1.19% sulfur.

We claim:

1. The process which comprises heating an aqueous solution of an aziridinyl compound having a plurality of 1-aziridinyl groups, a methylol phosphorus compound of the group consisting of tetrakis(hydroxymethyl)phosphonium chloride and tris(hydroxymethyl)phosphine oxide, and a sulfur-containing compound of the group consisting of sodium thiosulfate, potassium thiocyanate, 2-mercaptoethanol, thiourea, bis(2 - hydroxyethyl)sulfide, and bis(2-hydroxyethyl)disulfide.

2. The process of claim 1 wherein the aziridinyl compound is tris(1-aziridinyl)phosphine oxide, the methylol phosphorus compound is tetrakis(hydroxymethyl)phosphonium chloride, and the sulfur containing compound is sodium thiosulfate.

3. The process of claim 1 wherein the aziridinyl compound is tris(1-aziridinyl)phosphine oxide, the methylol phosphorus compound is tetrakis(hydroxymethyl)phosphonium chloride, and the sulfur containing compound is potassium thiocyanate.

4. The process of claim 1 wherein the aziridinyl compound is tris(1-aziridinyl)phosphine oxide, the methylol phosphorus compound is tetrakis(hydroxymethyl)phosphonium, chloride, and the sulfur containing compound is thiourea.

5. The polymeric reaction product of claim 2.
6. The polymeric reaction product of claim 3.
7. The polymeric reaction product of claim 4.

References Cited by the Examiner
UNITED STATES PATENTS 2,886,539  5/1959  Drake et al. _____ 260—2
3,053,778  9/1962  Toone _____ 260—45.7

OTHER REFERENCES

Smith-British Plastics, vol. 27, 1954, pages 213–217.

WILLIAM H. SHORT, *Primary Examiner.*

H. D. ANDERSON, *Assistant Examiner.*